Figure 11:
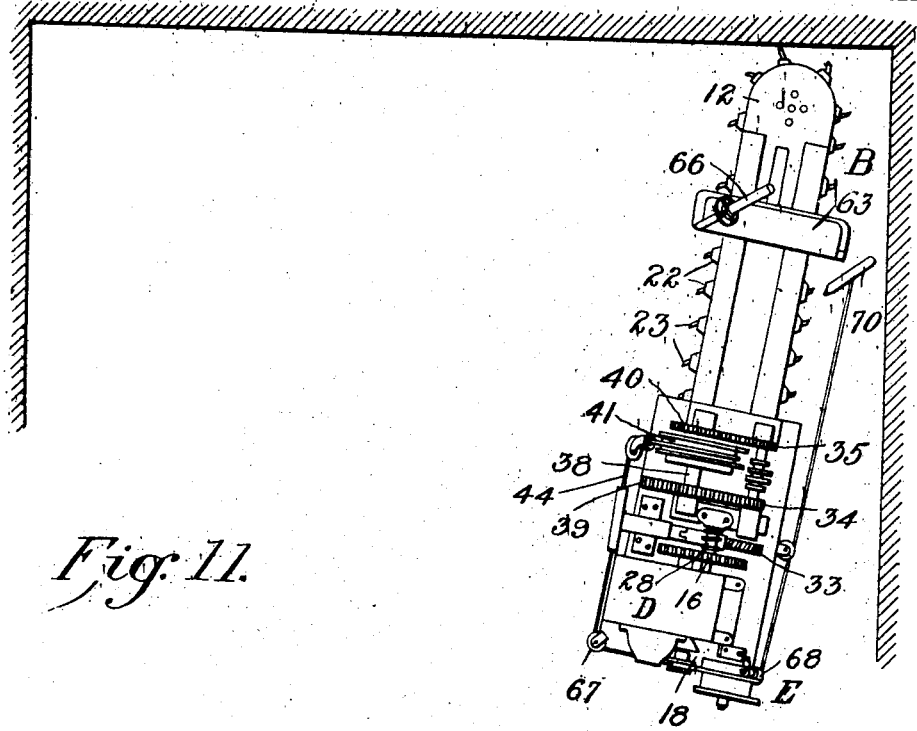

F. L. SESSIONS.
MINING MACHINE.
APPLICATION FILED JUNE 16, 1910. RENEWED SEPT. 18, 1913.
1,112,332.
Patented Sept. 29, 1914.
7 SHEETS—SHEET 1.
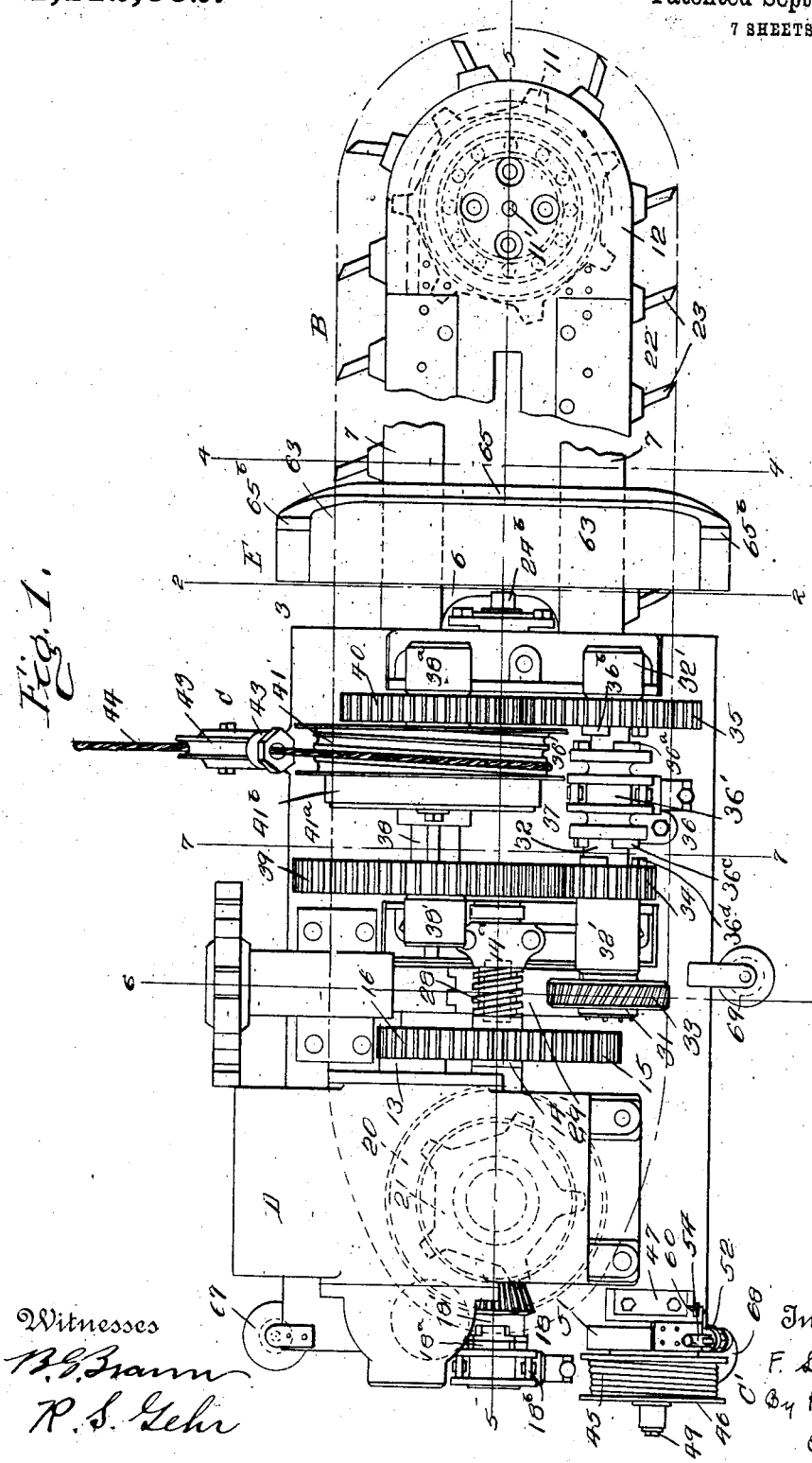
Witnesses
B. G. Brann
R. S. Gehr
Inventor
F. L. Sessions
By H. H. Bliss
Attorney F. L. SESSIONS.
MINING MACHINE.
APPLICATION FILED JUNE 16, 1910. RENEWED SEPT. 18, 1913.
1,112,332.
Patented Sept. 29, 1914.
7 SHEETS—SHEET 2.
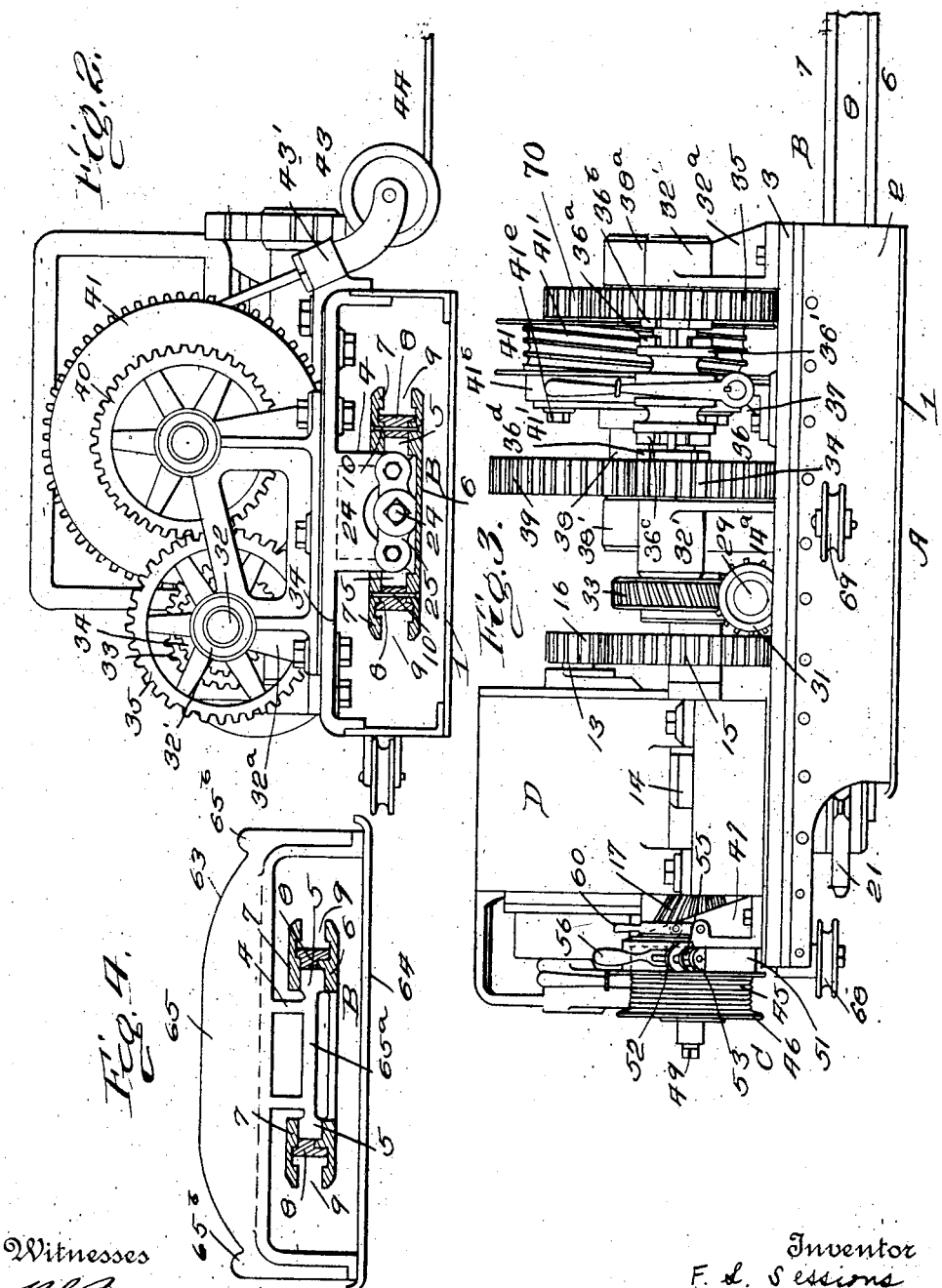
Witnesses
Inventor
F. L. Sessions
By H. H. Bliss
Attorney

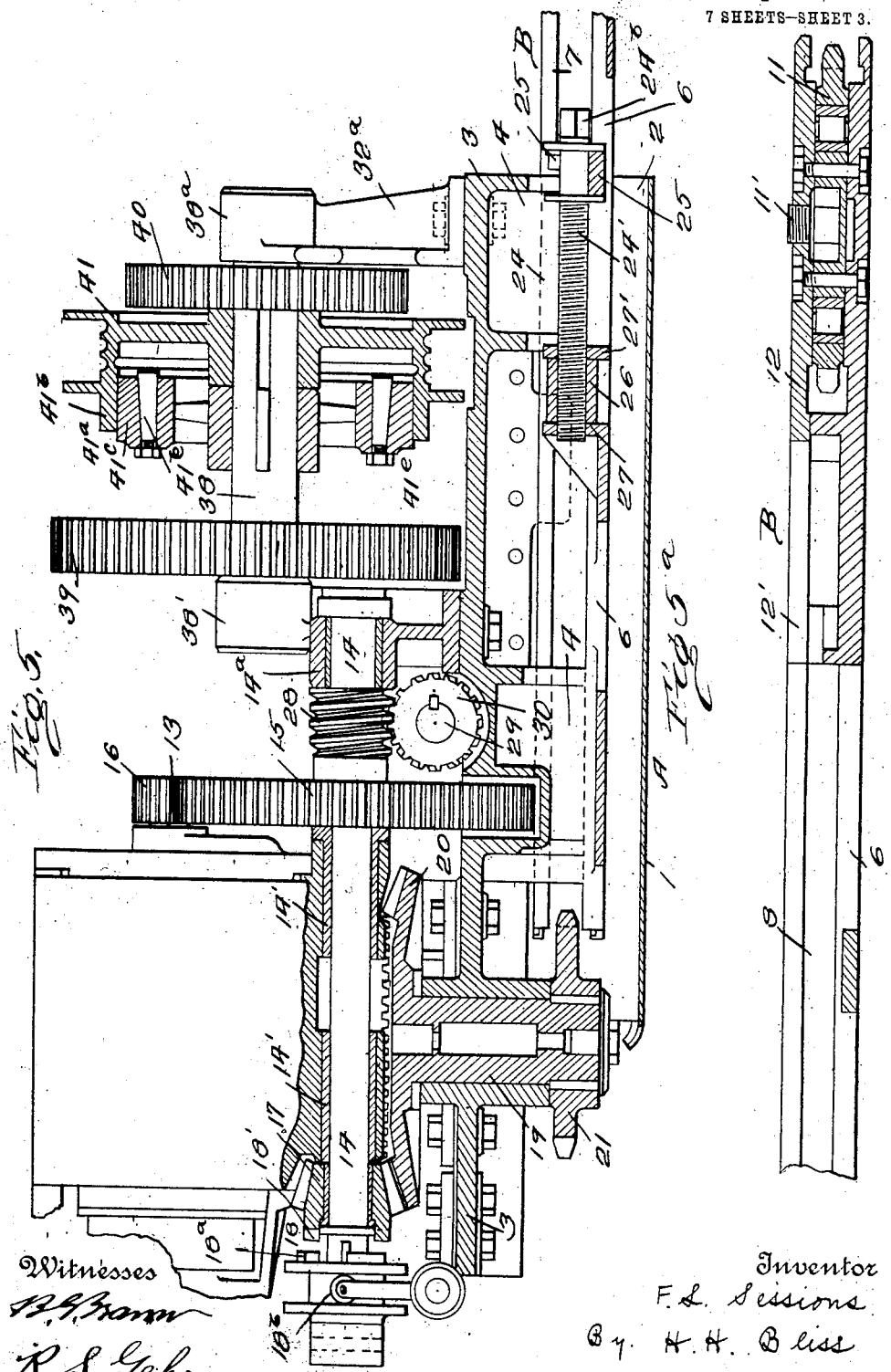

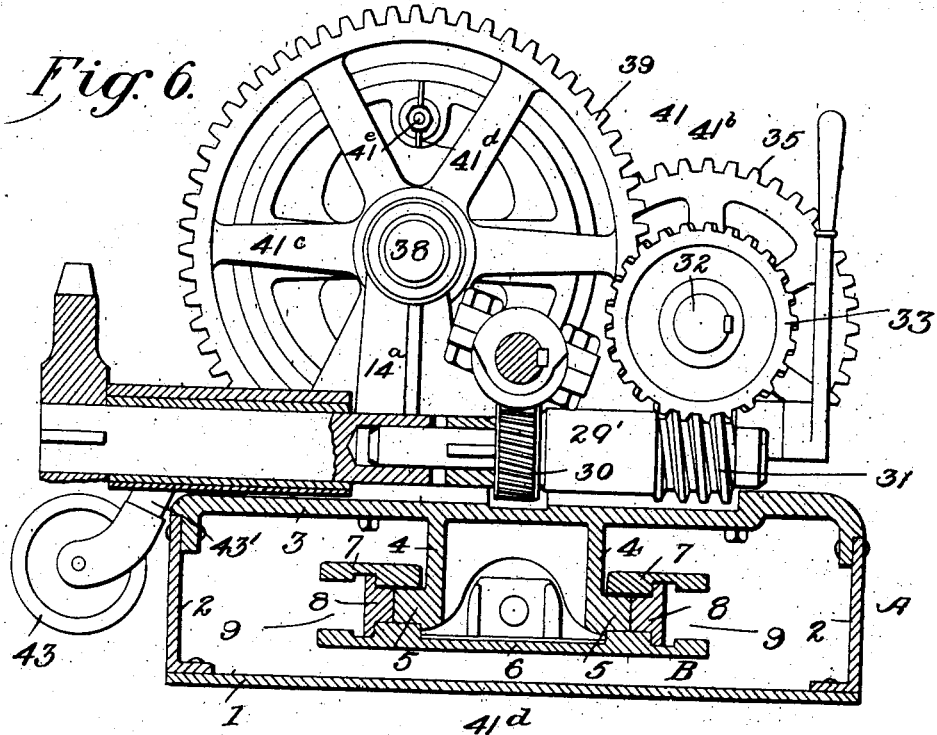
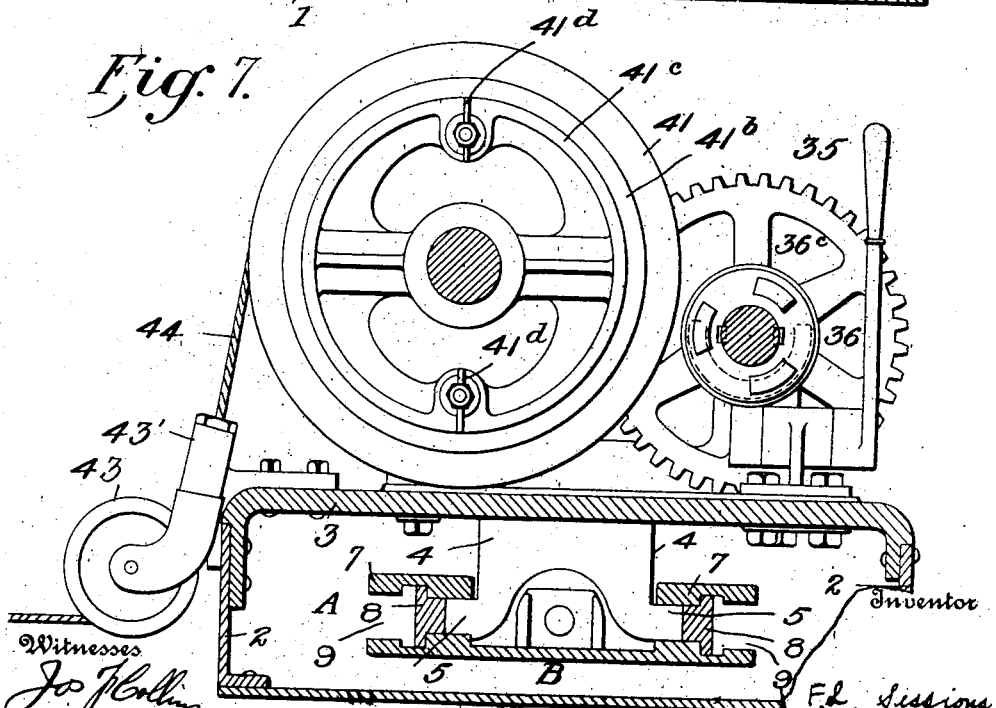

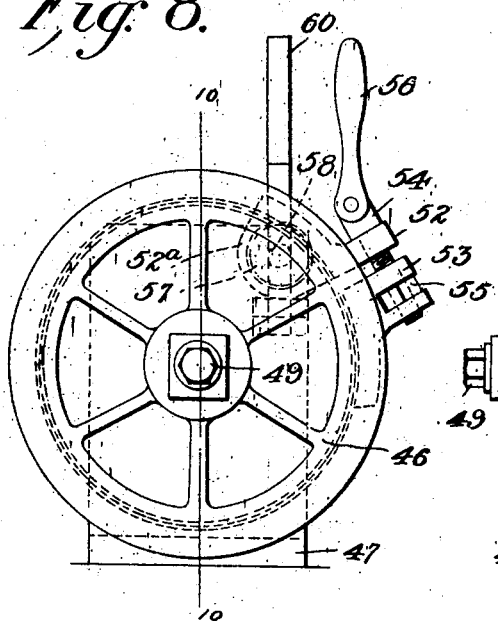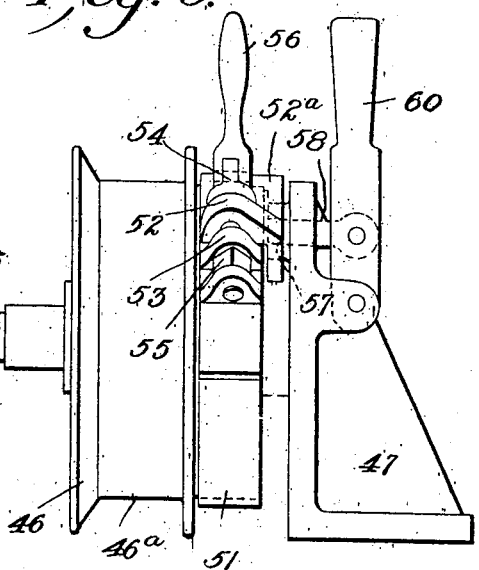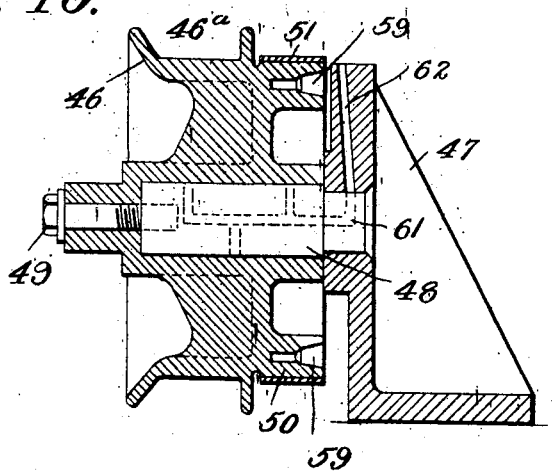

F. L. SESSIONS.
MINING MACHINE.
APPLICATION FILED JUNE 16, 1910. RENEWED SEPT. 18, 1913.

1,112,332.

Patented Sept. 29, 1914.
7 SHEETS—SHEET 6.

Witnesses
Jos. T. Collen
R. S. Gehr

Inventor
F. L. Sessions
By H. H. Bliss
Attorney

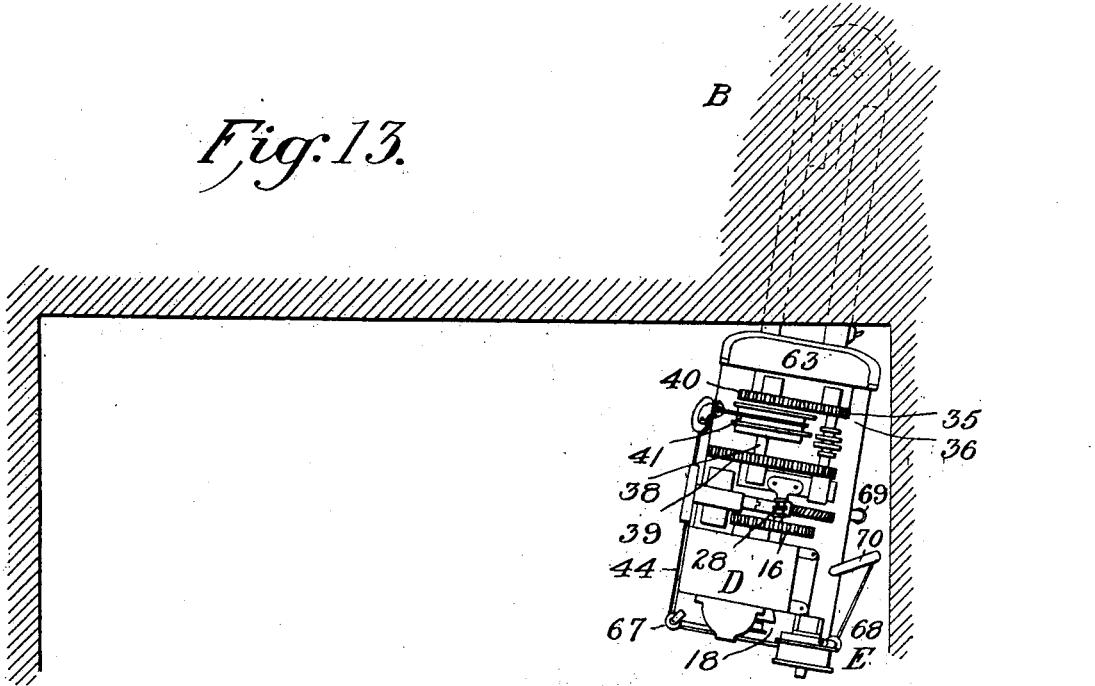
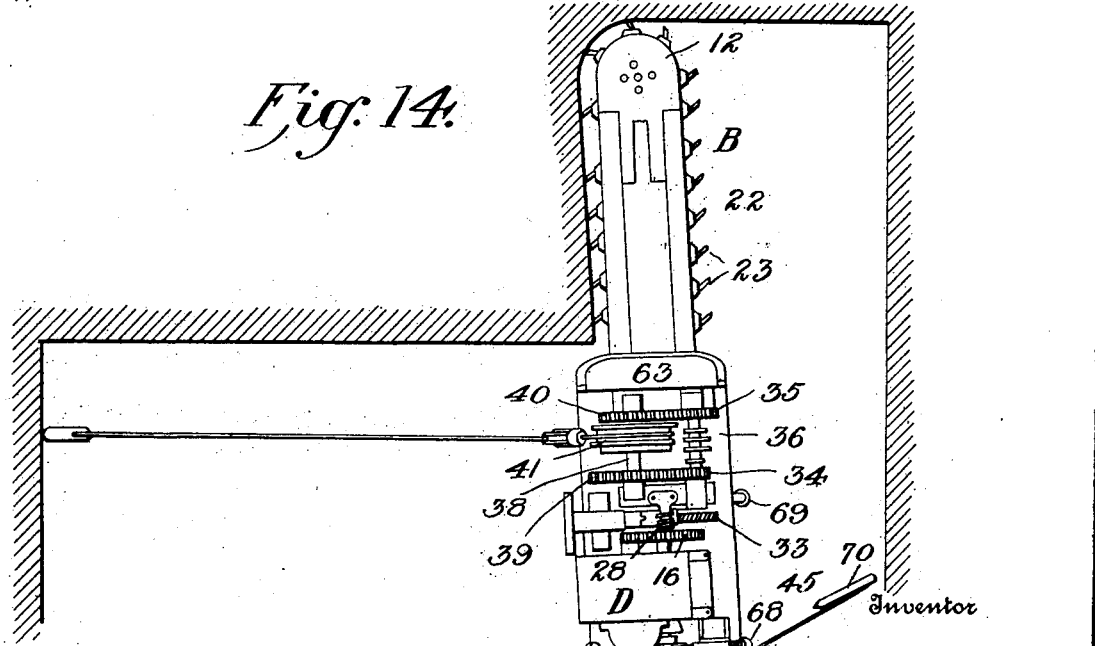

UNITED STATES PATENT OFFICE.

FRANK L. SESSIONS, OF COLUMBUS, OHIO, ASSIGNOR TO THE JEFFREY MANUFACTURING COMPANY, OF COLUMBUS, OHIO, A CORPORATION OF OHIO.

MINING-MACHINE.

1,112,332. Specification of Letters Patent. Patented Sept. 29, 1914.

Original application filed March 23, 1910, Serial No. 551,068. Divided and this application filed June 16, 1910, Serial No. 567,201. Renewed September 18, 1913. Serial No. 790,563.

*To all whom it may concern:*

Be it known that I, FRANK L. SESSIONS, a citizen of the United States, residing at Columbus, in the county of Franklin and State of Ohio, have invented certain new and useful Improvements in Mining-Machines, of which the following is a specification, reference being had therein to the accompanying drawing.

This invention relates to impovements in mining machines, particularly to the class of machines which are characterized by the fact that with the cutting apparatus and framework supporting it, one or more flexible wire cables are combined, together with accessory parts so constructed and arranged that the cables can be utilized for causing the advance of the cutting apparatus and frame along the coal face and also utilized under proper adjustment for holding the machine as an entirety to the proper lines parallel to the face of the coal as it moves under the draft from the cable.

In the handling of machines of this sort certain difficulties have been encountered, and one of these difficulties has to do with the guiding of the machine during the entering or so-called sumping cut. In making the sumping cut the machine is forced endwise along the lines transverse to the face of the coal, so as to advance the cutting apparatus under the coal preparatory to propelling the machine laterally along the face. The endless chain type of cutting apparatus is commonly employed in machines of this character and the reaction of the coal upon the cutters as they pass around the inner end of the cutter frame, especially during the first part of the entering cut, tends to swing the inner end of the machine laterally. To prevent this suitable guiding devices must be provided.

The principal object of the present invention is the provision of a machine of the character referred to having means for holding the machine to its work during the entering cut that are structurally simple and adapted to be conveniently handled, so that the making of the sumping cut and the starting of the side cut along the face can be effected in a minimum of time.

Figure 12:
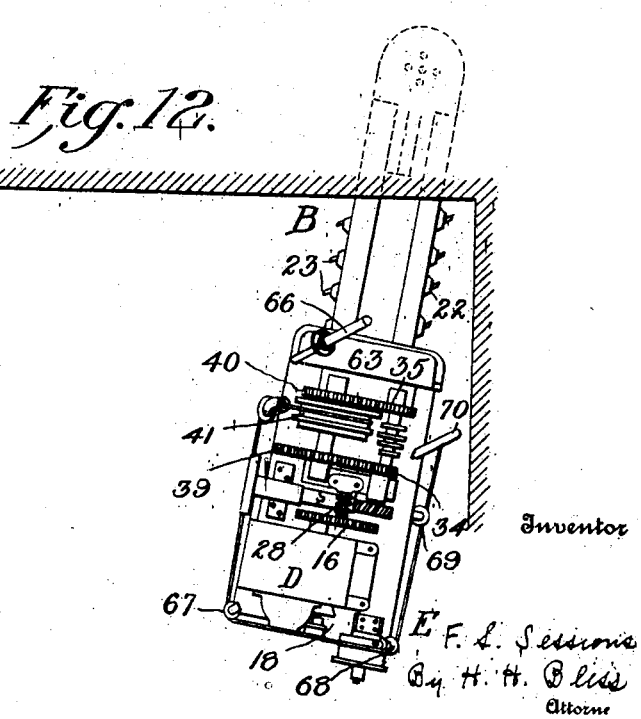

In the accompanying drawings which show a preferred embodiment of the invention. Figure 1 is a plan view of a mining machine embodying my improvements. Fig. 2 is a section on the line 2—2 of Fig. 1. Fig. 3 is a side elevation of the machine. Fig. 4 is a transverse section on the line 4—4 of Fig. 1. Figs. 5 and 5ª are enlarged sections on the line 5—5 Fig. 1, showing the operating mechanism and the other cutter frame respectively. Fig. 6 is a enlarged section on the line 6—6, Fig. 1. Fig. 7 is an enlarged section on the line 7—7, Fig. 1. Fig. 8 is an outer end elevation of the friction held angling or guiding drum. Fig. 9 is a side elevation of said drum. Fig 10 is a vertical section on the line 10—10, Fig. 8. Fig. 11 is a plan view on a small scale showing the machine in position near the right rib of a mine room to begin the entering or sumping cut. Fig. 12 is a similar view of the machine with the sumping cut partially completed. Fig. 13 is a similar view showing the machine when the sumping cut has been completed. Fig. 14 is a plan view on a small scale showing the machine as it is propelled across the room along the coal face to make the under cut.

For the purposes of illustration I have shown in the drawing a mining machine of which A indicates the bed frame as an entirety, B the cutting apparatus extending from the inner end thereof and supported thereby, C, C' the feeding and guiding mechanism for advancing the cutting apparatus and machine either longitudinally or laterally, D the motor mechanism and E the auxiliary parts employed when it is desired to have the cutting apparatus advanced into the coal transversely to the face thereof.

The bed frame may be of any suitable construction. I have shown it comprising a shoe 1 adapted to rest upon the ground, longitudinally arranged angle bars or plates 2, 2 secured to said shoe at either side thereof and a suitable platform 3 resting upon and secured to said longitudinal side bars.

4, 4 are webs or plates depending from the platform 3 and carrying at their lower ends the laterally turned longitudinally extending cutting apparatus guides 5, 5.

The cutting apparatus comprises a longitudinally arranged horizontally disposed base plate 6, two longitudinally arranged horizontally disposed guide plates 7 above said base plate and spaced therefrom by the longitudinally arranged bars 8 so as to form a chain guide or recess 9, the parts just referred to being secured together in any suitable manner, as by rivets 10.

11 is a front sprocket wheel mounted upon a vertical axis 11', and between the inner end of the base plate 6 and a top plate 12 suitably secured to the base plate and having an outwardly extending centrally arranged part 12' fitted snugly between the top bars 7, 7 of the chain frame.

The motor D is suitably secured upon the platform 3 with its armature shaft 13 arranged longitudinally of the machine, 14 is a longitudinally arranged shaft, preferably having its axis in the vertical longitudinal plane of the axis of the chain frame. It is suitably mounted near either end in bearings 14' and 14', one of which is carried by a bearing standard 14$^a$ suitably secured to the platform 3. The standard 14$^a$ extends transversely of the machine in either direction from the shaft 14 for the purpose to be hereinafter described.

15 is a spur gear rigidly secured to the shaft 14 and meshing with a pinion 16 secured to the inner end of the armature shaft 13.

17 is a bevel pinion loosely mounted on the shaft 14 near the outer end thereof.

18 indicates a positive clutch interposed between the said shaft 14 and the bevel pinion 17, the longitudinally stationary element 18' of said clutch being secured to the said bevel pinion and the longitudinally movable element 18$^a$ being splined to the shaft.

18$^b$ indicates suitable mechanism for moving the element 18$^a$ of the clutch in either direction.

19 is a vertically disposed shaft suitably mounted in bearings carried by the bed frame of the machine and having its axis in the vertical plane containing the axis of the shaft 14. 20 is a bevel gear secured to the upper end of the said vertical shaft and in mesh with the bevel pinion 17.

21 is a sprocket drive wheel rigidly secured to the lower end of the vertical shaft 19.

22 indicates as an entirety an endless cutter chain or carrier extending around the sprocket drive wheel 21 and the sprocket 11 carried by the cutter frame, it being arranged at either side within the guides 9 of the said cutter frame and carrying laterally extending cutters 23 of any suitable construction. The cutter frame is supported from the bed frame by the longitudinally arranged slides or guides 5 depending from the bed frame and arranged to fit snugly between the base plate and the upper plate of the chain frame. The bed frame and the chain frame are normally held from longitudinal movement relative to each other by mechanism indicated as an entirety by 24, which also serves as an adjusting means for moving the frames relative to each other to vary the tension upon the cutter chain. The adjusting mechanism 24 comprises a longitudinally arranged screw threaded shaft 24' mounted near its inner end in a bearing in a depending plate 25 which is secured to the inner end of the bed frame platform 3. Near its outer end it is fitted into a threaded nut 26 which is arranged between uprights or projections 27, 27' carried by the base plate 6. The inner end of this shaft is squared as indicated at 24$^b$ to receive a suitable wrench for turning the shaft in either direction so as to extend the chain frame relative to the bed frame or to adjust it in the opposite direction, as desired.

28 is a worm gear rigidly secured to the longitudinally arranged shaft 14 near the inner end thereof and between the bearing standard 14$^a$ and the gear wheel 15 secured to the said shaft. 29 is a shaft arranged beneath the said shaft 14 and transversely of the bed frame. It is suitably mounted in a bearing 29' secured to the platform of the said frame. 30 is a worm wheel secured to the inside end of the said transverse shaft 29 and in mesh with the worm 28 on the shaft 14.

31 is a worm rigidly secured to the outside end of the shaft 29.

32 is a longitudinally arranged shaft mounted near either end in bearings 32', 32', carried by bearing standards 14$^a$ and 32$^a$, the latter being arranged parallel to the former and of substantially the same width and secured to the platform of the bed frame. The axis of the shaft 32 is in a vertical longitudinal plane on the opposite side of the vertical longitudinal plane of the axis of the shaft 14 from armature shaft 13.

33 is a worm wheel rigidly secured to the outer end of the shaft 32 and in mesh with the worm 31 on the transverse shaft 29.

34 is a spur gear loosely mounted upon the shaft 32 adjacent to the bearing standard 14$^a$, and 35 is a gear wheel of greater diameter than the gear wheel 34 and loosely mounted upon the said shaft 32 adjacent to the bearing standard 32$^a$.

36 indicates as an entirety clutch mechanism for alternately connecting the gears 34 and 35 to the shaft 32. Of this clutch mechanism 36' indicates a longitudinally movable element splined to the shaft 32 and carrying at one end clutch jaws 36$^a$ adapted to engage clutch jaws 36$^b$ secured to the gear wheel 35 and at its other end clutch jaws 36$^c$ adapted to engage with the clutch jaws 36$^d$ carried by the gear wheel 34.

37 indicates as an entirety suitable mechanism for shifting the movable element 36' of the clutch in either direction at will.

38 is a longitudinally arranged drum shaft suitably mounted near either end in bearings 38', 38ᵃ in the bearing standards 14ᵃ and 32ᵃ respectively. The axis of the shaft is on the opposite side of the vertical plane containing the axis of the shaft 14 from the axis of the shaft 32.

39 is a gear wheel rigidly secured to the shaft 38 near one end thereof and in mesh with the gear wheel 34 on tne shaft 32, and 40 is a gear wheel of smaller diameter than the gear wheel 39 and rigidly secured near the opposite end of the shaft 38 and in mesh with the gear wheel 35 on the shaft 32.

41 is a cable winding drum loosely mounted on the shaft 38 and preferably adjacent to the gear wheel 40 at the inner end thereof. The periphery of the cable drum may be spirally grooved as indicated at 41' to assist in the spooling of a draft cable upon the drum. The drum is preferably connected to the shaft 38 by means of a friction clutch 41ᵃ, one element of which is a ring or casing 41ᵇ carried by the drum and extending outwardly therefrom, and the other element of which is a pulley or ring 41ᶜ having its rim radially slotted at 41ᵈ, 41ᵈ, as indicated.

41ᵉ are adjustable wedges or expanders arranged between the sections of the rim at said slots and adapted to force the periphery of the rim into engagement with the inner walls of the ring 41ᵇ in the well known manner.

43 is a pulley or sheave arranged to receive and guide the cable 44 as it is wound upon or is paid out from the drum 14. This pulley 43 is mounted in a swiveling support having a spindle mounted in a bracket bearing 43'. The pulley spindle can be turned so that the pulley can be made to lie in either of several planes. When the machine is in operation and is being bodily advanced along the face of the coal the pulley is substantially at right angles to the longitudinal lines of the machine. When the machine is being advanced longitudinally to make the sumping cut the pulley is turned into rearward position, as shown in Figs. 11, 12 and 13, as will be more fully described presently. The pulley may in fact be made to take any angular position, within a range of about 180°, as may be desired, in moving the machine about under its own power by means of the draft cable 44. Thus when it is desired to unload the machine from the truck on which it is transported from room to room, the pulley may be turned inward and the draft cable made fast at some point in advance of the machine to draw the machine from the truck. In order to have the pulley 43 automatically assume the most advantageous position when stress is being exerted upon the cable, the pulley support or carrier is so constructed as to hold the pulley axis in a plane other than the plane of the axis of the spindle part. In other words, the pulley carrier is similar to the fork carrier of a caster wheel.

For the purpose of guiding the machine or assisting to guide it while it is being propelled laterally along the face of the coal, I employ a supplemental cable 45 and a drum 46 upon which said cable may be wound. This drum is mounted upon a bracket 47 on the outer end of the machine, said bracket being provided with a horizontally extending hub or stub shaft 48, upon which the drum 46 turns. The drum is held in position upon the shaft 48 by means of screw bolt 49. In addition to the groove or recessed part 46ᵃ of the drum upon which the cable is wound, a cylindrical extension 50 is provided with which a flexible brake band 51 coöperates. Clamping lugs 52 and 53 are riveted or otherwise secured to the respective ends of the brake band 51. These lugs are perforated to receive a clamping bolt or screw 54 and the lug 53 is slotted to receive a nut 55. This nut, when the parts are in position as shown in Fig. 8, engages the bottom of the slot formed in the lug 53 so that it cannot turn. And thus by turning the bolt 54 one way or the other the bracket band may be tightened or loosened as desired. As a convenient means for turning the screw bolt 54 a handle 56 is pivotally secured to the end of said bolt. A partial revolution of the bolt can be made with the handle and then by swinging the handle on its pivot the turning movement can be continued. The lug 52 is formed with a vertical extension or flange 52ᵃ which is perforated so as to pass over a cylindrical boss 57 on the bracket 47, and the brake band is thus prevented from being bodily displaced.

It may at times be desirable to positively lock the drum against rotation independently of the brake band. To this end a locking pin 58 is slidably mounted in the bracket 47, as shown in Figs. 8 and 9, in position to engage in one of a series of holes or sockets 59 formed in the adjacent face of the drum 46 or of its extension 50. The pin 58 is pivotally connected to a hand lever 60 by means of which it can be readily moved into and out of locking position.

The shaft 48 upon which the drum is mounted is preferably formed with suitable ducts 61 through which oil may flow to the bearing surfaces of the drum, and a duct 62 may be formed in the bracket 47 through which oil may be supplied to the duct 61.

For the purpose of feeding and guiding the machine during the initial or sumping cut I provide the following devices. 63 is a guide frame which comprises a bottom part or shoe 64 designed to slide over the floor of the mine and an upper transverse bridge part 65 which rests upon the shoe and spans the cutter frame in the manner shown in Fig. 4. The transverse frame part 65 carries a depending guide bracket 65ª, which extends between and slidably engages the side bars or plates 6 and 7 of the cutter frame a relative sliding movement between the guide frame and the cutter frame of the machine being thus provided for. The extent of this movement is indicated in Figs. 11 and 12, which show the extreme positions of the guide frame in relation to the machine. The bridge part 65 is provided at its ends with upstanding rounded lugs 65ᵇ, 65ᵇ which are adapted to receive the lower ends of screw jacks, such as 66 (see Fig. 11). Such jack or jacks may be set between the guide frame 63 and the roof of the mine so as to clamp the guide frame rigidly on the floor of the mine, or at least hold it against movement transverse of the machine. The prevention of such movement is the main thing required, and it is to be understood that I do not mean to limit myself to the use of a jack for this purpose.

In order that the winding cable 44 may be efficiently used in connection with the guide frame 63 for making the sumping cut, the main frame of the machine is preferably provided with guide sheaves or pulleys 67, 68 and 69. The cable 44 may be extended outward from the swiveled pulley 43, passed around the pulleys 67 and 68 and thence extended inward over pulley 69 to a suitable anchoring device, such as a jack at 70.

The manner in which my improved machine operates will readily be understood from the above description.

Assuming that it is desired to under-cut the face of the coal in a room of a mine which is operated on the "room and pillar" plan, the machine is first put into the position shown in Fig. 11 adjacent the right rib and with the cutting apparatus directed toward and approximately at right angles to the face of the coal to be under cut. The guide frame 63, having been moved inward as far as it will go in relation to the cutter frame, is now jacked down, as indicated in Fig. 11, the draft cable 44 is passed outward over the guide pulleys 67 and 68 on the outer corners of the machine and thence inward over the guide pulley 69 on the right side of the machine to the jack 70. Current now being applied to the motor, it is set in operation and drives the shaft and gearing down to and including the clutch element at 18ª and also the clutch element at 36. The operator upon shifting these drive clutch elements into engagement with their companion parts causes the power to be transmitted first to the cutting apparatus and secondly to the winding drum 41. Thereupon the machine as an entirety is drawn endwise toward and against the coal. As the cutters engage the coal the re-action tends to swing the inner end of the machine to the right and its outer end to the left, but such movement is prevented by the combined action of the guide frame 63 and the draft of the cable 44 on the rear outer corner of the bed frame. The frame 63 acts in this manner as a guide until the main frame of the machine is advanced into engagement with it at which point the motor is stopped. The position of the machine at this time is shown in Fig. 12. The cutters are so far now under the coal that further guidance by the frame 63 is not essential. Accordingly, the jack 66 having been removed the motor is again started and the remainder of the sumping cut is completed bringing the machine into the position shown in Fig. 13. During the latter part of the sumping cut it will be understood, of course, that the guide frame 63 moved bodily with the machine.

The initial or sumping cut having been made in the manner stated, the machine is next propelled laterally along the face of the coal to effect the under cutting in the following manner. The cable 44 is detached from the jack 70 and stretched along the face of the coal to the left rib where it is made fast to an anchor as, for example, a jack 71. The end of cable 45 is now made fast to the jack 70, which, if necessary, may be re-set in a position more nearly opposite the friction drum 46. The motor is now started, or if the motor has been running idle the clutch elements 18ª and 36 are thrown into operative position whereupon the cutters begin to move and the winding drum 41 to rotate. The rotation of drum 41 draws upon the cable 44 so that the machine is gradually fed laterally along the face of the coal, the cutters meanwhile effecting the under cut. The position of the machine during this operation is indicated in Fig. 14. If the machine during this operation were subjected only to the draft force of the cable 44 and to the re-action of the coal upon the cutters the outer end of the machine would tend to swing around to the left and the cutters would not be held up to their work. This, however, is prevented by the cable 45 which is paid out against the friction of brake band 51 upon the extension 50 of the drum 46. This frictional force, and therefore the tension in cable 45, can be varied at will by simply adjusting the clamping bolt 54 of the brake. The operator thus has within his control a very simple yet efficient and convenient means for controlling the angular position of the machine in relation to the coal face. If the outer end of the machine tends to swing too much to the left it is only necessary to tighten the brake band of drum 46 to sufficiently retard the outer end of the machine. On the other hand, when the inner end of the machine tends to feed too rapidly in relation to the outer end, it is only necessary to loosen the brake band somewhat.

If at any time it is desired to angle the machine quickly and to a considerable extent, the locking pin 58 may be thrown into engagement with the winding drum 46 so as to positively lock it against rotation. The outer end of the machine then becomes practically stationary while the inner end and the cutting apparatus are swung forward by the draft of propelling cable 44. When the machine has in this manner been swung into the desired position in relation to the coal face the locking pin 58 is withdrawn and the machine is allowed to advance bodily under the control of the friction brake on drum 46. The provision of the positive lock for drum 46 obviates the necessity of using the brake to effect a substantial locking of the drum, and this is advantageous as the brake tends to operate more reliably when the range of the braking pressure or tension is not too great. It is obvious, furthermore, that the provision of the positive lock saves the braking apparatus from considerable wear and tear.

It will be observed on referring to Fig. 13 that when the sumping cut is finished the machine stands at an angle to the right rib and to the coal face. Such an angular position is not suitable for making the under-cut along the face, the proper angular position of the machine relative to the coal face being more nearly that shown in Fig. 14. Preferably the machine is angled from the position shown in Fig. 13 to that shown in Fig. 14 at the beginning of the side cut by locking the retarding drum against rotation, thus causing the machine to swing about its outer right hand corner as the propelling cable is wound upon the inner drum. As soon as the machine reaches the desired angle the outer drum is unlocked and allowed to turn under the control of the friction brake or, if the drum had been locked by tightening down the brake, the latter is loosened to permit the drum to turn at the rate necessary to maintain the desired angle of the machine.

It will be observed that during the lateral movement of the machine along the face of the coal the guide frame 63 remains in position upon the cutter frame and in direct engagement with the inner end of the bed frame. The said guide frame thus serves the additional function of a buffer for the inner end of the main frame, the inner face of the guide frame being given a rounded or oval conformation, as shown in Fig. 1, to adapt it to readily slide along the face of the coal.

I do not in this application claim the friction controlled winding drum and its cable, which are employed for guiding and angling the machine while cutting along the face, as that forms the subject matter of my co-pending application, Serial No. 551,068, filed March 23, 1910, of which the present application is a division.

What I claim is:—

1. In a mining machine, the combination of a bed frame, a cutter frame projecting from the inner end of the bed frame, a series of cutters mounted upon said cutter frame, means for bodily propelling the machine transversely to the coal face to initially advance the cutters under the coal, a rigid guide slidably mounted on the cutter frame, said guide being constructed to engage the floor of the mine, and means for fixing said guide in position on the mine floor.

2. In a mining machine, the combination of a bed frame, a cutter frame projecting from the inner end of the bed frame, a series of cutters mounted upon said cutter frame, means for bodily propelling the machine transversely to the coal face to initially advance the cutters under the coal, a guide mounted permanently on the cutter frame to slide longitudinally thereof, and means for anchoring said guide.

3. In a mining machine, the combination of a bed frame, a cutter frame projecting from the inner end of the bed frame, a series of cutters mounted upon said cutter frame, means for bodily propelling the machine longitudinally to make the initial cut under the coal and laterally to undercut the coal along its face, and a guide mounted slidably upon the cutter frame and adapted to be fixed in position to guide the cutter frame during the initial cut and to abut against the inner end of the bed frame and the face of the coal as the machine is propelled laterally.

4. In a mining machine, the combination of a bed frame, a cutter frame projecting from the inner end of said bed frame, a series of cutters mounted upon the cutter frame, means for guiding the cutter frame as it is advanced longitudinally, a draft cable extending from the rear side of the bed frame inward to an anchor, and means for winding up said cable to advance the machine longitudinally.

5. In a mining machine, the combination of a bed frame, a cutter frame projecting from the inner end of said bed frame, a series of cutters mounted upon the cutter frame, a draft cable, a winding drum therefor mounted on the bed frame, a plurality of guide pulleys for the cable on the bed frame whereby the cable may be extended from the front side of the machine along the coal face to propel the machine laterally or may be extended from the rear side of the machine toward the coal face to advance the machine longitudinally, and means for guiding the cutter frame as it is advanced longitudinally.

6. In a mining machine, the combination of a bed frame, a cutter frame projecting from the inner end of the bed frame, a series of cutters mounted upon said cutter frame, means for bodily propelling the machine transversely to the coal face to initially advance the cutters under the coal, a guide frame comprising a bottom plate adapted to engage the mine floor and an up-standing part on said bottom plate slidably engaging the cutter frame, and means for anchoring the guide frame.

7. In a mining machine, the combination of a bed frame, a cutter frame projecting from the inner end of the bed frame, a series of cutters mounted upon said cutter frame, means for bodily propelling the machine transversely to the coal face to initially advance the cutters under the coal, a guide frame slidably engaging said cutter frame and having its outer side formed to fit against the inner end of the bed frame and its front side rounded to slide along the face of the coal when the machine is propelled laterally, and means for anchoring the guide frame.

8. In a mining machine, the combination of a bed frame, a cutter frame projecting from the inner end of the bed frame, a series of cutters mounted upon said cutter frame, means for bodily propelling the machine transversely to the coal face to initially advance the cutters under the coal, a guide frame arranged transversely of the cutter frame and comprising a bottom plate adapted to slide over the mine floor, and a bridge part on said bottom plate spanning the cutter frame, and having a depending bracket slidably engaging the cutter frame, the outer side of said bridge part being formed to fit against the inner end of the bed frame and the inner side of said bridge part being rounded to slide along the face of the coal when the machine is propelled laterally, and means for anchoring the guide frame.

9. In a mining machine, the combination of a bed frame, a cutter frame projecting from the inner end of the bed frame, a series of cutters mounted upon said cutter frame, means for bodily propelling the machine transversely to the coal face to initially advance the cutters under the coal, a guide mounted permanently on the cutter frame to slide longitudinally thereof, and means for holding said guide against movement transverse of the machine.

10. In a mining machine, the combination of a bed frame, a cutter frame projecting from the inner end of the bed frame, a series of cutters mounted upon said cutter frame, means for bodily propelling the machine longitudinally to make the initial cut under the coal and laterally to undercut the coal along its face, and a guide mounted slidably upon the cutter frame and adapted to be held against movement transverse of the machine during the initial cut and to abut against the inner end of the bed frame and the face of the coal as the machine is propelled laterally.

11. In a mining machine, the combination of a bed frame, a cutter frame projecting from the inner end of the bed frame, a series of cutters mounted upon said cutter frame, means for bodily propelling the machine transversely to the coal face to initially advance the cutters under the coal, a guide frame slidably engaging said cutter frame, and having its outer side formed to fit against the inner end of the bed frame and its inner side rounded to slide along the face of the coal when the machine is propelled laterally, and means for holding the guide frame against movement transverse of the machine.

12. In a mining machine, the combination of a bed frame, a cutter frame projecting from the inner end of the bed frame, a series of cutters mounted upon said cutter frame, means for bodily propelling the machine transversely to the coal face to initially advance the cutters under the coal, a guide frame comprising a bottom plate adapted to engage the mine floor and an up-standing part on said bottom plate slidably engaging the cutter frame, and a jack for clamping the guide against the mine floor.

In testimony whereof I affix my signature, in presence of two witneses.

FRANK L. SESSIONS.

Witnesses:
E. P. SNIVELY,
A. M. READ.